(12) United States Patent
Wack et al.

(10) Patent No.: US 7,951,672 B2
(45) Date of Patent: May 31, 2011

(54) MEASUREMENT AND CONTROL OF STRAINED DEVICES

(75) Inventors: Daniel C. Wack, Los Altos Hills, CA (US); Ady Levy, Sunnyvale, CA (US); John Fielden, Los Altos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 12/904,731

(22) Filed: Oct. 14, 2010

(65) Prior Publication Data

US 2011/0027919 A1    Feb. 3, 2011

Related U.S. Application Data

(62) Division of application No. 12/199,633, filed on Aug. 27, 2008, now Pat. No. 7,838,309.

(60) Provisional application No. 60/970,545, filed on Sep. 7, 2007.

(51) Int. Cl.
*H01L 21/336* (2006.01)

(52) U.S. Cl. ............ 438/257; 438/5; 438/264; 438/167; 438/669; 257/88; 257/288; 257/E21.409; 257/E33.062

(58) Field of Classification Search .............. 438/5, 687, 438/633, 692, 264, 197, 669, 257; 257/88, 257/288, E21.409, E33.062
See application file for complete search history.

(56) References Cited

U.S. PATENT DOCUMENTS

| | | | |
|---|---|---|---|
| 6,489,240 B1* | 12/2002 | Iacoponi et al. | 438/687 |
| 2004/0235205 A1* | 11/2004 | Levy et al. | 438/14 |
| 2010/0271621 A1* | 10/2010 | Levy et al. | 356/73 |

* cited by examiner

*Primary Examiner* — William M Brewster
*Assistant Examiner* — Wilner Jean Baptiste
(74) *Attorney, Agent, or Firm* — Luedeka, Neely & Graham, P.C.

(57) ABSTRACT

A method that includes measuring stress on at least one of a monitor substrate, a production substrate, and a proxy device on a production substrate to produce stress data, measuring shape on at least one of a proxy device on a production substrate and a production device on a production substrate to produce shape data, and inputting the stress data and the shape data into an elastic deformation calculation to determine a stress value for a production device.

8 Claims, 3 Drawing Sheets

MEASUREMENT AND CONTROL OF STRAINED DEVICES

This application claims all rights and priority on U.S. provisional application Ser. No. 60/970,545 filed 2007 Sep. 7 and U.S. application Ser. No. 12/199,633 filed 2008 Aug. 27. This invention relates to the field of integrated circuits. More particularly, this invention relates to measurement of properties of integrated circuit structures such as during fabrication.

FIELD

Background

The operation of integrated circuit devices, such as semiconductor devices, can be improved when the crystalline channel material is under stress, because the resulting lattice strain in the channel region changes the electronic band structure which in turn can change the electron and hole mobilities.

As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

Under favorable conditions, the electron or hole mobility increases in strained channels, and thus the operation of the integrated circuit improves. Usually it is desired to increase the mobility of holes in the channel of PMOS transistors and electrons in the channel of NMOS transistors. Lattice strain in the channel is controlled by the geometry and magnitude of the stress applied to the channel region. Stress can be applied through deposited films, epitaxially-grown materials, or through substrate materials, such as strained silicon on insulator structures.

A few leading-edge manufacturers of integrated circuit logic devices first started deliberately introducing strain into their devices at the ninety nanometer process node, because they found that it advantageously improved the carrier mobility. More logic manufacturers incorporated strain into their devices at the sixty-five nanometer node, and all manufacturers will be using strain in their devices at the forty-five nanometer node. It is anticipated that eventually the manufacturers of integrated circuit memory devices will also adopt strain engineering into their products.

The effect of deposited-film residual stress on silicon substrates can be measured through the resulting bow of the substrate using, for instance, optical measurements of substrate deflection or curvature across the substrate. However, this technique does not have the required sensitivity when the deposited film is very thin, or has low stress, and only a very small degree of bow is imparted to the substrate.

Extensive prior art research has failed to find a correlation between residual stress and easily measured film properties such as refractive index or absorption in ultra-violet, visible, or infrared radiation bands. Lattice constant measurements using X-ray diffraction provide a direct measurement of strain in crystalline materials, but are prohibitively time-consuming—requiring thirty minutes or more per measurement site.

As the geometries of integrated circuits continue to shrink, it becomes harder to control the strain within the transistor channel, so traditional metrology based on measurements of blanket films on monitor wafers is insufficient to guarantee that the desired mobility will be enhanced adequately across the entire substrate. To address this issue, manufacturers will need metrology tools that work on production substrates.

Spectroscopic ellipsometry has been used to measure changes in the dielectric function due to strain. However, the signals related to strain are very difficult to separate from the signals related to grating diffraction, and the systematic errors in the absolute optical response of each optical system. In the case of very thin silicon on insulator films (less than about twenty nanometers), the quantum confinement effects modify the silicon dielectric function away from that of bulk silicon, making it harder to determine what part of the change in dielectric function is due to quantum confinement and what part is due to strain.

Although there will typically be only two process steps that generate the strain (one for NMOS devices and another for PMOS devices), control of the strain will be of high value to integrated circuit manufacturers, because it will allow them to yield more devices into the faster speed bins.

What is needed, therefore, is a system that overcomes problems such as those described above, at least in part.

SUMMARY

The above and other needs are met by a method that includes measuring stress on at least one of a monitor substrate, a production substrate, and a proxy device on a production substrate to produce stress data, measuring shape on at least one of a proxy device on a production substrate and a production device on a production substrate to produce shape data, and inputting the stress data and the shape data into an elastic deformation calculation to determine a stress value for a production device.

In various embodiments according to this aspect of the invention, the electrical properties of the production device are estimated based at least in part on the stress value for the production device. In some embodiments a difference between the stress value for the production device and a desired stress value for the production device is determined. In some embodiments the parameters of up-stream stress inducing processes are adjusted to reduce the difference between the stress value and the desired stress value of later-processed production substrates. In some embodiments the parameters of down-stream processes are adjusted to compensate for the difference between the stress value and the desired stress value of the production substrate.

According to another aspect of the invention there is described an apparatus that has a stress measuring module for measuring stress on at least one of a monitor substrate, a production substrate, and a proxy device on a production substrate, and thereby produces stress data, a shape measuring module for measuring shape on at least one of a proxy device on a production substrate and a production device on a production substrate to produce shape data, and a controller for receiving the stress data and the shape data into an elastic deformation calculation to determine a stress value for a production device.

In some embodiments the stress measuring module includes a probe that produces a beam that is reflected off a measurement spot on a surface of the substrate. A pump laser produces a beam that impinges on the measurement spot. A spectrograph receives the reflected probe beam and delivers the reflected probe beam to a detector array, which produces signals based on the received reflected probe beam. A controller receives the signals and produces the stress data.

In various embodiments according to this aspect of the invention, the probe is a xenon arc lamp, and the probe beam is delivered to the measurement spot by fiber optics. In some embodiments the probe beam is passed through a filter prior to reflecting off the measurement spot. In some embodiments the pump beam passes through a modulator prior to impinging on the measurement spot. In some embodiments the reflected probe beam is delivered to the spectrograph by fiber optics. The stress measuring module in some embodiments is a spectroscopic modulated photoreflectance system. In some embodiments the shape measuring module is an optical scatterometer. In some embodiments the stress measuring module and the shape measuring module share a common beam source.

In some embodiments of the invention, one or more specialized test structures are created on the substrate to enable the measurement of both the strain in the silicon and of the shapes that help generate that strain. At least one of those structures is fabricated in such a way that all of the films overlying the strained silicon are substantially transparent at ultraviolet and visible wavelengths, allowing an optical instrument such as that disclosed herein to measure the strain of the silicon. When the transistor devices have a gate electrode material (such as doped polysilicon, metal, or semimetal) overlying the strained channel, the test structure is designed so that those absorbing layers are either removed or not deposited over the strained silicon regions during processing of the test structure. Shape measurements using optical scatterometry or another technique are taken on at least one of the test structure and an associated test structure. The substantially opaque materials might not have been omitted from the associated structure. The strain and shape measurements are combined to provide a more accurate estimate of the strain within nearby transistor channels.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the different views, and wherein.

DETAILED DESCRIPTION

The various embodiments of the present invention are an improvement on the methods and systems for obtaining measurements of strain properties in integrated circuits, such as silicon semiconductor devices and other crystalline semiconductor materials.

Film stress can be measured using large spot measurements on monitor substrates (non production substrates), on very thin films that can't be measured by standard film stress tools. To achieve the high sensitivity that is needed for these applications, a technique called spectroscopic modulated photoreflectance is used, where the optical properties at the direct band gap of the substrate material (such as silicon) is modulated, and the measurement of those properties is accomplished with a reflected probe beam that has a sufficient spectral bandwidth and resolution. Using a low-frequency-modulated optical beam such as a laser (called a pump) is an effective method for modulating the channel optical properties, despite the presence of a stressed layer that has been deposited over the channel, as long as the stressor layers are transparent to the pump beam, or at least only very weakly absorbing. The materials commonly employed to apply and transmit stress to the channel, silicon nitrides and oxides, are largely transparent to radiation at or near the direct band gap of silicon, the so-called $E_1$ critical point region near 360 to 380 nanometers.

Figure 1:
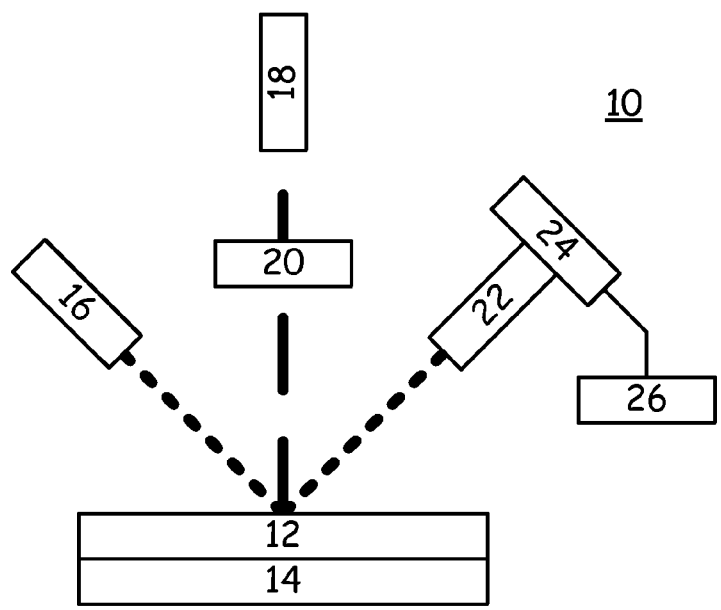
FIG. 1 depicts a functional block diagram of a system for the measurement of strained silicon underneath a stressed film, using a large spot optical system.

Thus, these measurements can be accomplished using a large spot system on a strained silicon sample buried beneath a silicon nitride film, as depicted in FIG. 1, and described in more detail below. Such a measurement on a monitor substrate provides information on the state of residual stress in the silicon nitride film deposition process. This can be generalized to more complex film stacks, as long as they remain transparent in the wavelength region near $E_1$.

With reference now to FIG. 1, there is depicted a spectroscopic modulated photoreflectance system 10 according to an embodiment of the present invention. In FIG. 1, the strain beneath a layer 12, such as silicon nitride, is to be tested, as it resides on top of a substrate 14, such as a silicon wafer. There are three main parts to the system 10, including a probe 16, a pump 18, and a spectrograph 22. The probe 16 can be provided such as by a xenon arc lamp. Fiber optics can be used to couple the probe assembly 16 to filter and then out through an optics head to deliver the beam to the sample spot on the substrate 14. The pump is preferably a laser that produces a beam that passes through a modulator 20. Again, fiber optics can deliver the beam through an optics head to the sample spot on the substrate 14. The reflected probe beam is received by a spectrograph 22. This can again be accomplished through an optics head and fiber optics. The spectrograph 22 is coupled to a detector array 24 that creates signals and provides the signals to a controller 26.

Figure 2:
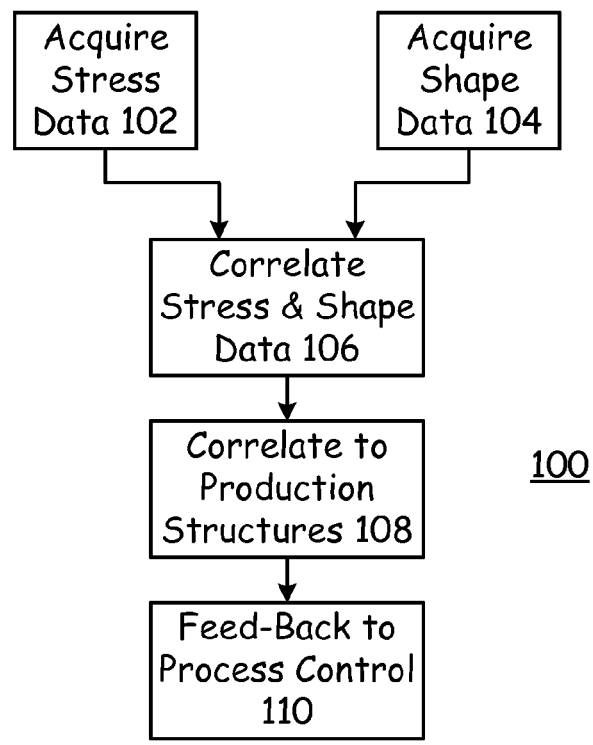
FIG. 2 depicts a flow chart of the combination of information to determine the stresses within production devices and structures.

According to the method 100 as depicted in the flow chart of FIG. 2, the film stress information from the monitor substrates, as given in block 102, and the geometry information from optical critical dimension measurements, acquired at device design rules on production substrates, as given in block 104, is correlated as given in block 106. This correlation is then further correlated to approximate the stresses in similarly shaped production structures, as given in block 108. Finally, that information is used as feed back to enable effective process control and disposition of future production substrates, as given in block 110.

The desired geometry information can be provided in a number of different ways, including planar thin film, OCD (spectroscopic, angle-resolved, etc.), X-ray, scanning electron microscope, atomic force measurement, and so forth. One instrument that would work well is an optical scatterometer, which is an ellipsometer or reflectometer equipped with appropriate software, as described in U.S. Pat. Nos. 5,739,909, 5,867,276, 6,483,580, and 6,429,943.

The film stress information from the monitor substrates, and the geometry information from the production substrates can be input to an elastic deformation calculation to determine the amount of strain in the channel area of the device. This can be accomplished, for example, using finite element methods. The electronic properties of the device can also be estimated by adding a model for the strain dependent band structure. Complex layout-dependent strain and mobility effects can also be simulated. Using this information, decisions about the disposition and processing of the production substrates can be conditioned on the behavior of the most sensitive channel regions of a complex unit cell.

The software to accomplish these mathematical models can be implemented in the metrology tool or in a separate computer or controller that collects the metrology information from one or more metrology tools, combines the relevant metrology information, possibly using finite-element models of the test structure or the transistor, and produces estimates of the strain within the transistor. The strain results can be communicated to the metrology tool or directly to the host computer/controller to allow dispositioning of the production substrates.

In another embodiment, channel strain is measured and film stress is estimated on production substrates using a proxy test target that is placed in the scribe line of a production substrate, and spectroscopic modulated photoreflectance measurements of the strain within that proxy target are taken. While monitor substrate measurements are useful, they might not capture all of the sources of variation that are relevant to the performance of the strained device. For example, the interaction of pattern density or aspect ratios with film deposition and annealing may result in film stress behavior that only weakly correlates with that as observed from monitor substrates.

Figure 3:
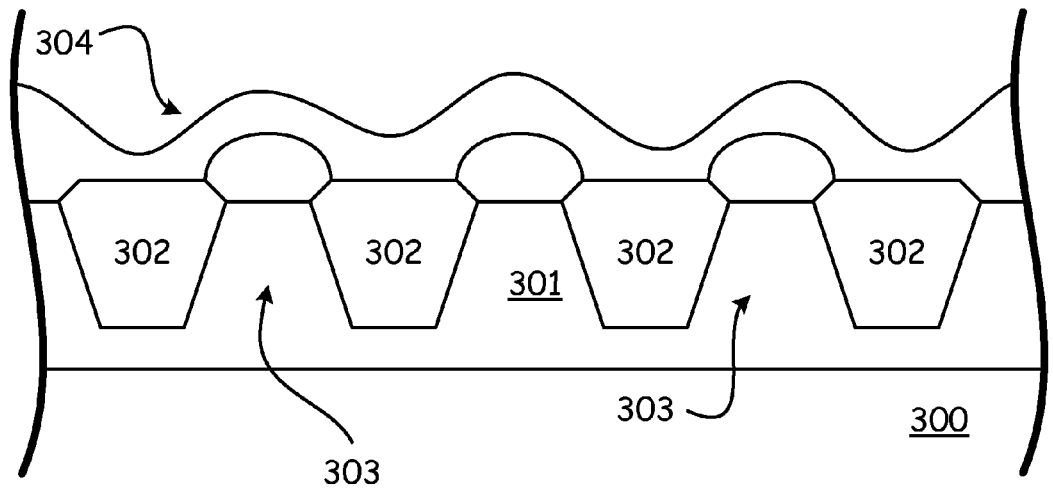
FIG. 3 depicts a cross section of a test structure for measuring strain levels in silicon according to a first embodiment of the present invention.

FIG. 3 depicts a proxy test structure 300 for measuring film stress on production substrates 301. The test structure 300 includes equally spaced parallel trenches 302 that are etched into the substrate 301 at the same time as, and with at least one dimension similar to, the trenches that are etched into the source and drain structures of the transistors on the substrate 301. When the transistor trenches are epitaxially filled with a material such as silicon germanium or silicon carbide, the trenches 302 of the test structure 300 are also filled with the same material. Because the material filling the trenches 302 has a different lattice constant than the crystalline substrate 301, the material in the trenches 302 exerts compressive or tensile stresses on the substrate 301 material. The trenches 302 may be long parallel lines, or may be rectangular or other shaped islands. For example, each side of the whole test structure 300 may be between about ten microns and about one hundred microns long.

Figure 4:
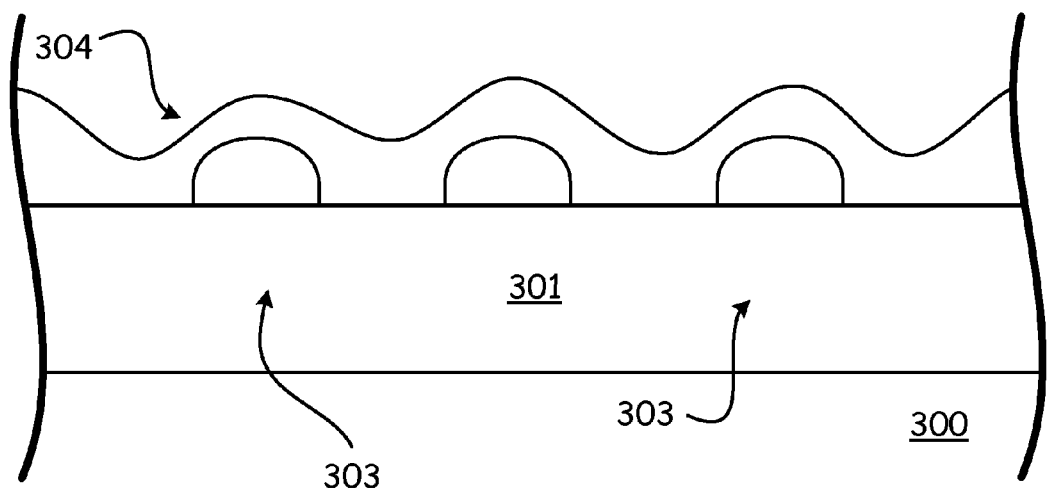
FIG. 4 depicts a cross section of a test structure for measuring strain levels in silicon according to a second embodiment of the present invention.

One or more of the dielectric layers 304 that form the transistor spacers and stress liners are present. Some of these layers 304 may be etched so that only certain regions of the structure 300 are covered by the etched layer, and other layers 304 may remain as a blanket over the whole test structure 300 (both are depicted in the example of FIG. 3), so that the test structure 300 more accurately reproduces the strain of the transistor in the strained regions of the test structure 300. Thus, these test structures 300 provide more accurate information than prior-art test structures, since more of the layers 304 that affect channel stress are included in the test structure 300. FIG. 4 depicts a cross section through another proxy test structure 300 that does not include the trenches 302, and might be more suitable for monitoring stress in transistors where trenches in the source and drain structures are not used.

In such cases it is desirable to measure the film stress or the channel strain on production substrates and on structures that have device-like design rules. In traditional planar CMOS devices, the gate electrode is formed on top of the channel, with materials (such as poly-silicon gate electrodes) and thicknesses that are usually optically opaque at the $E_1$ critical point. To access the channel region with an optical probe beam in reflection geometry, the gate electrode must be eliminated or removed. As depicted in FIGS. 3 and 4, only dielectric layers 304 overlie the strained material 301 in the test structures 300.

Because additional processing steps on product substrates is a significant burden in a production environment, the scribe-line metrology target may differ from device design in some geometric aspects, in order to provide a strained channel that has only transparent materials on top of it.

Such proxy targets might not strain the channel region in exactly the same way as occurs in the actual device (horizontal versus vertical directions, or different magnitudes of strain), but as long as there exists a strong correlation with the resulting channel strains, the process control objective is achieved.

Similar to the method involving the combination of monitor substrate data as described above, the proxy target stress/strain data is combined with the geometric data from one or more of the production devices, the same proxy target, or different proxy targets. This can be accomplished in a control system that uses elasticity and band structure calculators to forecast strain and mobility in device channel regions.

The design of the proxy target could be such as to enhance the sensitivity of the proxy target to process and optical considerations, as exhibited by the film stress, channel strain, and patterning process variabilities. For instance, the proxy target geometry may be essentially one dimensional (line/space), while the device is two dimensional (channel material in island geometry).

Figure 5:
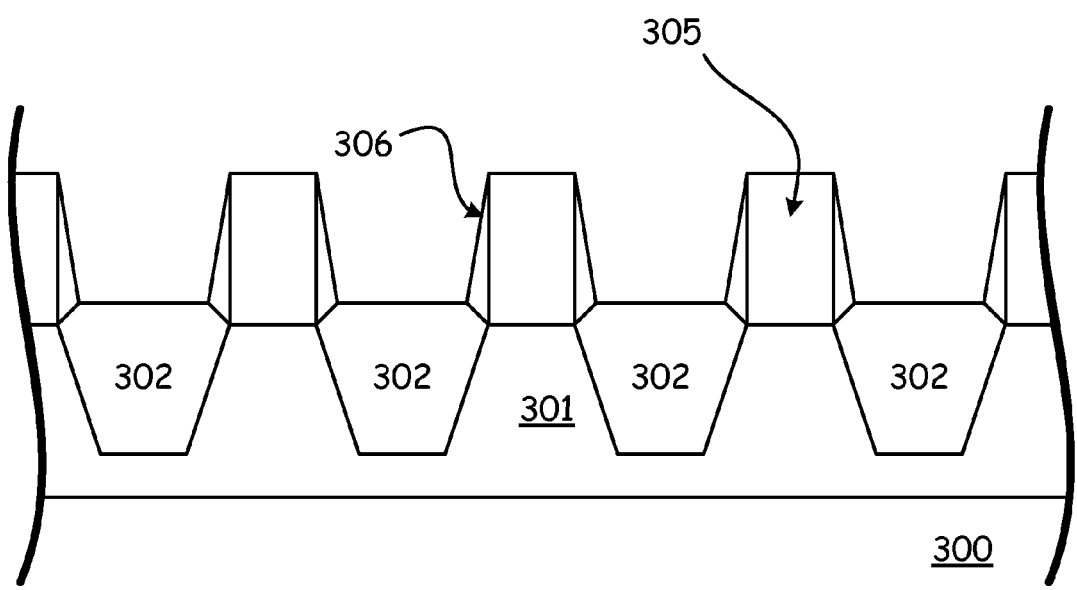
FIG. 5 depicts a cross section of a test structure for measuring geometric information (dimensions and shapes) of structures associated with the formation of transistors.

The proxy target for measuring geometric data could be the same as, or similar to, the proxy target structure 300 that is used for measuring strain, such as those depicted in FIGS. 3 and 4. Alternately, a geometry proxy target 300 as depicted in FIG. 5 can be used alone or in combination with the strain proxy target 300 of FIGS. 3 and 4 to determine the geometric data for computing the device channel strain. The proxy test structure 300 of FIG. 5 includes long parallel lines that are fabricated at the same time as and use the same materials as the transistor, and whose cross section approximates the cross section of a transistor. If trenches are present in the transistor, then trenches 302 can be included in the test structure 300, or they may be omitted from the test structure 300. The gate electrode or hardmask material 305 is present in the test structure 300. The transistor spacer or stress liner layers 306 may also be present.

When performing a zero-order diffraction measurement on a periodic structure (symmetric geometry), enhancements to optical sensitivity result from optimal illumination angles, which provide maximum electric field values at the material regions or interfaces of control interest. This can be estimated through using a rigorous electromagnetic solver, geometric, and material models for the sample. When performing measurements at non-zero orders (asymmetric geometry), both illumination and collection angles can be optimized, through variations of target periodicities in the two in-plane directions. Process and optical sensitivities may have opposite trends with pitch, so in general these two goals must be balanced.

When spectroscopic modulated photoreflectance and other optical metrology methods are routinely combined on the same type of production substrate, optical components can be combined so as to save cost. For example, some or all of the light path and optics for the pump beam for spectroscopic modulated photoreflectance can be combined with the other near-normal incidence paths in typical optical metrology, such as pattern recognition optics, or reflectometer illumination and collection.

In another example, when the measurement requirements for the probe beam in spectroscopic modulated photoreflectance are well matched to those of a spectroscopic ellipsometer system, at least over a small spectral region (near $E_1$), then the illumination and collection paths of the probe and the spectroscopic ellipsometer optics can be combined. The resulting system may acquire the two types of information in sequential or even parallel modes of operation. Although measurement spots may not be co-located in some instances, in others, it will be favorable to align the illuminated regions. Further, two methods may share the same broadband source, or two methods may share the same detector.

Thus, the embodiments of the present invention allow more accurate non-destructive determination of the strain within transistors and the ability to monitor within-substrate and substrate-to-substrate variations. By combing strain and shape information, more accurate determinations can be made of the yield at a given device speed, avoiding unnecessary scrapping of substrates or wasteful processing of bad substrates through subsequent processing steps.

Knowing the changes in shape geometry before the strain is created allows the strain-inducing processes to be adjusted to compensate, or vice-versa if the strain-inducing processes precede an etch process that controls a critical shape. Knowing the within-channel strain potentially allows other process parameters (for example, implant or gate dielectric process steps) to be adjusted by small amounts to compensate for small deviations in strain from the optimal degree, allowing the best compromise between performance and yield.

One embodiment of the present invention is a software feature on an analyzer that collects data from multiple metrology tools including some or all of the film metrology tools (ellipsometers or reflectometers), stress measuring tools, X-ray diffraction tools, spectroscopic modulated photoreflectance tools, optical critical dimension tools, critical dimension scanning electron microscopes, atomic force microscopes, and combines the information from the same substrate (or substrates within the same batch or processed on the same process tools or process chamber) and feeds information such as film thickness, strain (possibly measured in more than one kind of structure or substrate), and the shape of the patterned structures into a finite-element model (or a simplified parametric model created by running and analyzing a finite-element model under many different conditions), and predicts the within-channel strain for PMOS and NMOS transistors.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method comprising the steps of:
   measuring stress on at least one of a monitor substrate, a production substrate, and a proxy device on a production substrate to produce stress data by,
      reflecting a probe beam off a measurement spot on a surface of the substrate,
      directing a pump beam that is separate from the probe beam onto the measurement spot, and
      producing the stress data based on characteristics of the reflected probe beam,
   measuring critical dimension shape on at least one of a proxy device on a production substrate and a production device on a production substrate to produce shape data, and
   inputting the stress data and the shape data into an elastic deformation calculation to determine a stress value for a production device.

2. The method of claim 1, further comprising the step of estimating electrical properties of the production device based at least in part on the stress value for the production device.

3. The method of claim 1, further comprising the step of determining a difference between the stress value for the production device and a desired stress value for the production device.

4. The method of claim 3, further comprising the step of adjusting parameters of up-stream stress inducing processes to reduce the difference between the stress value and the desired stress value of later-processed production substrates.

5. The method of claim 3 further comprising the step of adjusting parameters of down-stream processes to compensate for the difference between the stress value and the desired stress value of the production substrate.

6. A method for approximating strain in semiconductor transistor devices, at a point in time when the semiconductor transistor devices have overlying layers that are substantially opaque to ultraviolet and visible wavelengths of radiation, the method comprising the steps of:
   forming a first test structure and a second test structure on a common substrate with and concurrently with the semiconductor transistor devices,
   measuring strain in the first test structure, where the first test structure is fabricated identical to the semiconductor transistor devices, except that the first test structure omits the overlying layers that are substantially opaque to ultraviolet and visible wavelengths of radiation,
   measuring geometry of the second test structure, where the second test structure has a geometry that is substantially identical to a geometry of the first test structure, and the second test structure includes the overlying layers that are substantially opaque to ultraviolet and visible wavelengths of radiation, and
   combining the strain and geometry measurements to produce an approximation of the strain in the semiconductor transistor devices.

7. The method of claim 6, wherein the overlying layers that are substantially opaque to ultraviolet and visible wavelengths of radiation are gate electrode layers of the semiconductor transistor devices.

8. The method of claim 6, wherein the geometry of the second test structure is measured using optical scatterometry.

* * * * *